United States Patent [19]

Combette

[11] Patent Number: 4,898,079
[45] Date of Patent: Feb. 6, 1990

[54] ELECTRIC OR ELECTRONIC POSITION SENSOR DEVICE

[75] Inventor: Marc Combette, Bel Air, France

[73] Assignee: Celduc S.A., Paris, France

[21] Appl. No.: 244,179

[22] Filed: Sep. 14, 1988

[30] Foreign Application Priority Data

Sep. 16, 1987 [FR] France ................. 87 12806

[51] Int. Cl.$^4$ .................. F01B 25/26; F01B 31/12
[52] U.S. Cl. .................. 92/5 R; 91/DIG. 4; 73/730; 200/82 E; 200/82 R; 335/205; 324/207.13
[58] Field of Search ........ 92/5 R, 5 L; 91/1, DIG. 4; 73/730, 756; 200/82 E, 82 R, 82 A, 82 C; 335/205; 324/207, 208

[56] References Cited

U.S. PATENT DOCUMENTS

| | | | |
|---|---|---|---|
| 3,017,621 | 1/1962 | Taborsky | 324/208 |
| 4,071,725 | 1/1978 | Smith et al. | 200/82 E |
| 4,086,456 | 4/1978 | Bone | 200/82 E |
| 4,230,023 | 10/1980 | Ward | 92/5 R |
| 4,549,469 | 10/1985 | Plester et al. | 91/1 |
| 4,594,487 | 6/1986 | Grassi et al. | 200/82 E |
| 4,677,378 | 6/1987 | Tokura et al. | 324/208 |
| 4,680,436 | 7/1987 | Brausfeld et al. | 200/82 E |
| 4,752,657 | 6/1988 | Kane et al. | 200/82 E |
| 4,755,637 | 7/1988 | Turck | 200/82 C |

FOREIGN PATENT DOCUMENTS

| | | | |
|---|---|---|---|
| 0044287 | 1/1982 | European Pat. Off. | 92/5 R |
| 2073199 | 9/1971 | France . | |
| 0195907 | 12/1982 | Japan | 91/DIG. 1 |
| 2180914 | 8/1987 | United Kingdom . | |

Primary Examiner—Robert E. Garrett
Assistant Examiner—Thomas Denion
Attorney, Agent, or Firm—Bell, Seltzer, Park & Gibson

[57] ABSTRACT

The electric and/or electrical sensor or detector device is intended to cooperate with a movable element surrounded by a shell, it comprises an annular clamping collar adapted to be clamped in position on a shell and connected to at least one connecting conductor, the collar carrying at least one mechanical and electrical removable member for connection to a removable detector element and the device is applied to a position detector to be quickly and removably secured onto a fluid cylinder body.

5 Claims, 2 Drawing Sheets

ELECTRIC OR ELECTRONIC POSITION SENSOR DEVICE

BACKGROUND OF THE INVENTION

1. Field of the invention

The present invention concerns an electric and/or electronic sensor or detector device for a movable element the position of which has to be detected with reference to a stationary element or station.

Sequentially and servo-controlled systems use numerous position sensors or detectors which allow to locate the completion of a sequence, such as the stroke of a piston of a jack. Adjustment of the position of these detectors with respect to the movable members whose displacement they control, as well as maintainance of their detection elements, which are themselves relatively fragile, generally imply higher costs than those corresponding to the movable member itself. Each time one of these detectors is defective, it is in fact necessary not only to replace it, thereby requiring uncabling and cabling of the conductors, but more frequently to further adjust its position and its securing which often happens to be difficult.

The present invention proposes facilitating the placing in and position setting of sensors such as position detectors, while allowing the simple replacement of the sensor element per se.

SUMMARY OF THE INVENTION

For this purpose, according to the invention, the sensor device comprises an integral annular clamping collar including at least one resilient part; a sensor element adapted to the collar and of which the shell is located at least partially in a cantilevered manner with respect to the clamping collar; a member for connecting the sensor element to the claimping collar; at least one connection lead or conductor for connecting the sensor element to a monitoring system, whereby the electrical connection between the conductor and the detector element is made in a block or shell, which is integral with the collar and manufactured in an electrically insulating and resilient material. Putting in place the sensor thus only requires clamping of the collar without any tooling operation and without any inserted securing piece. By previously clamping the collar after a first rough positioning of the sensor it is possible to overcome the friction of the collar, on the shell where it is clamped, by means of pushings or of slight shocks in order to ensure the placing of the sensor, monitored, for example, by electric and/or electronic results obtained after its position setting. When the sensor is defective, after a certain service life, in order to proceed to its replacement, it is sufficient to unplug the defective sensor and to plug in its place the spare part, if necessary by screwing it by means of a maintaining screwing, without changing the position of the new sensor element with respect to that of the previous one. The fixation of the sensor and its positioning are thus performed in a definitive way although the sensor element, itself, is perfectly removable.

According to an embodiment of the invention, the connecting element is formed with a shell which is bound to a part of the clamping collar.

According to another embodiment of the invention, the connecting conductor is adapted to the part of the shell of the sensing device which is bound to the clamping collar and projects or is cantilevered with respect to this collar.

According to another embodiment of the invention, the connecting element can be an intermediary element of the sensor to which the sensor element can removably be secured.

According to another embodiment of the invention, the connecting element is removably adapted to the collar.

According to another embodiment of the invention, at least one of the connection conductors protrudes the block or shell of the clamping collar substantially tangentially with respect to the circle formed by the collar.

According to still another embodiment of the invention, the plugs or terminals of the connection member are perpendicularly directed with respect to one side of the block or shell which is substantially parallel to the median plane of the collar.

The electrical connection between the connecting conductor and the removable connection member can be disposed in an electrically insulated block having several sides and protruding from the external surface of the clamping collar. The annular clamping collar and the insulated block are integral and provided with two resilient extensions coming closer together in order to form a clamping collar cooperating with clamping means. One of the sides, preferably the most external side of the insulated block, can bear reference marks for the sensor device or sites for placing such marks.

When the sensor device according to the invention is applied to a movable member to be located such as a piston or a piston rod or piston rod for a cylindrical fluid cylinder, the annular clamping collar is clamped in position on the external surface of the cylindrical body of the fluid cylinder, guiding respectively the connecting conductor(s) tangentially with respect to the transversal section of the body of the fluid cylinder and the connection member parallelly to the axis of the fluid cylinder, in order to place the active part of the interchangeable detector element opposite a point to be located on the movable element, through rotation of the clamping collar and axial sliding thereof on the outer surface of the body of the fluid cylinder, so that after adjusting and clamping the collar, the fixed position of the removable connection member strictly determines the position of the interchangeable detector element.

DESCRIPTION OF THE DRAWING

Other aims, advantages and features will become apparent from reading the description of an embodiment of the invention, given by way of non-limitative illustration, with respect to the appended drawing in which.

DESCRIPTION OF THE PREFERRED EMBODIMENTS OF THE INVENTION

Figure 1:
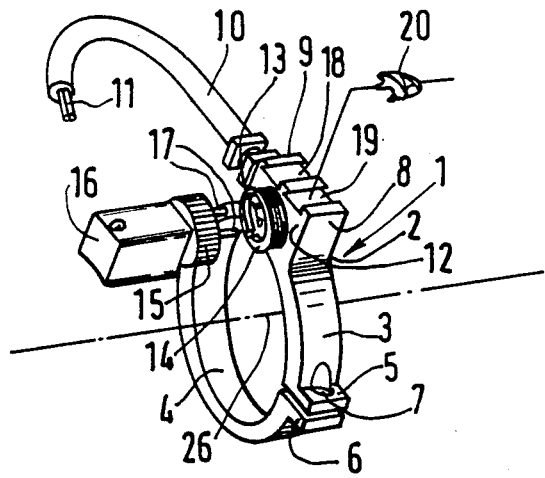
FIG. 1 is a partially exploded perspective view of the sensor device according to the invention, prior to its mounting on a shell of a movable element to be controlled and prior to the mounting of the removable sensor element.

FIG. 1 shows the support of a sensor 1 in the general form of an integral annular collar 2 having two elastic limbs 3 and 4 closing one towards the other, at their free end, by means of an extension 5, 6. In order to provide means for clamping the collar 2, extensions 5, 6 are respectively provided with a bore 7 and a counter-sunk nut (not visible on the perspective views).

The clamping collar 2 made of relatively resilient electrically insulating material, preferably plastic material, is surmounted with an element or block 8 having several faces integral with it. On one of the lateral sides 9 of the insulated integral piece 8 protrudes substantially tangentially with respect to the outer circle of the collar 2, an insulated wire 10 having several connection wires 11 to a monitoring circuit fed by sensor 1 and not shown.

On one of the axial sides 12 of the insulated block 8 protrudes parallelly to the axis of the collar 2 a multiterminal connector 13 for connecting to the conductors 11, surrounded by a threaded sleeve 14 upon which will be screwed the threaded ring 15 of the connection of removable detector element 16. The connection terminals (preferably female) of the connector 13 form with the pins 17 (male pins), integral with the removable element 16, and the threaded sleeve 14 cooperating with the ring 15 a removable mechanical and electrical connection member for the detector element 16 mounted on the insulated block 8, this connection element allowing to connect the output wires 11 towards the outside relative to the detector element 16. It may be observed at the upper part (according to FIG. 1) or the outer part of the insulated block 8 grooves 18 and 19 having a transversal dovetail section and in each of which can be slided removable marks 20 allowing to designate and locate the sensor 1, for example after its mounting. The detector elements 16 the most frequently used are Hall effect detectors or with flexible blades (called Reed detectors) having a length of 25 to 29 mm and adapted to work over a wide temperature range (for example comprised between −40° and 150° C.). These detectors with low electrical power are perfectly interchangeable and are therefore provided with connectors screwed or equipped with long pins guaranteeing the accuracy and reliability of their securing on the insulating block 8.

The positioning and the operating of the sensor device 1 that has been described herein-above will now be described with reference to FIG. 2. It has been proposed, for example to detect the exit of a movable bar 21 actuated by a cylinder 22 of which the rod is not represented (and can be the movable bar itself). The movable bar 21 that comprises an element for energizing the sensor, generally a magnet, is surrounded by a shell formed of protective plates 23 and 24.

In order to put in place the sensor 16, it is previously mounted on the collar 2 by connection means 8, 13, 14, 15, 17 and the elastic limbs 3 and 4 are opened so that they are engaged in an annular collar on the plates 23 and 24 by surrounding them. Thereafter, the collar 2 is previously clamped on these plates 23 and 24 by means of a clamping screw 25 which crosses through the bore 7 of the extension 5 and is screwed on the nut (not represented) which is sunk into into the extension 6.

After the previous clamping of the collar 2 on the plates 23 and 24 it is possible, by exerting moderate efforts, to cause to turn the collar on the plates by several degrees and to displace it axially on its axis 26 which thus coincides with the axis of the cylinder 22. Due to these small displacements exerted against the friction of the collar 2 on the plates 23 and 24, it is possible to bring the axis of vision (optical, electrical, magnetic or other) of the detector element 16, i.e. its active part, into the exact position where the detector element must detect or locate the arrival of the movable bar 21. The connection of the wires 11 onto the control circuits activated by the sensor 1 allows furthermore to be sure of the effective detection point of the movable bar 21 which is here the moving element to be detected.

After definitive adjustment of the position of the active part of the detector 16 (the axis of vision 27), a definitive clamping of the collar 2 is performed by means of the screw 25 and the insulated detector support block 8 thus rests reliably in place and will remain so when a defective detector element 16 is subsequently replaced.

Figure 2:
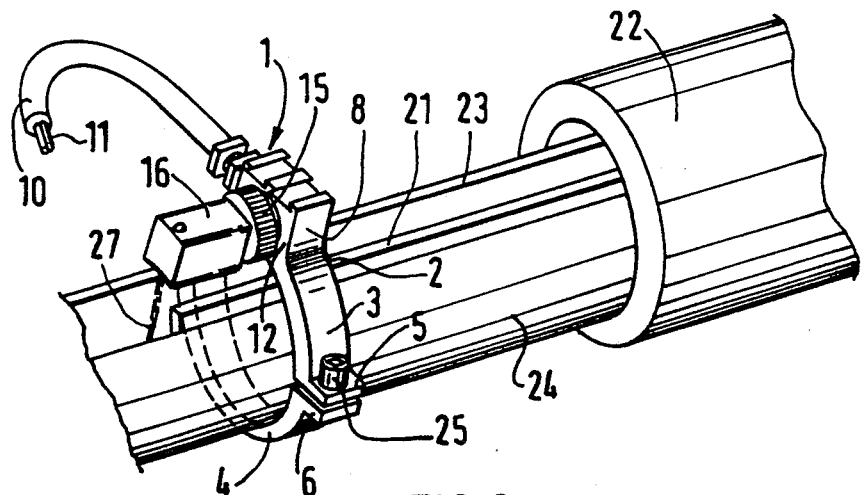
FIG. 2 is a perspective view of the sensor device according to the invention, secured and adjusted in position on the shell of a movable member to be controlled.

It can be seen, from the embodiment illustrated by FIG. 2, that the sensor device 1 according to the invention can for example be advantageously applied for detecting the arrival at the stroke end of a piston or piston rod of a cylinder, such as a pneumatic cylinder. The annular collar 2 is thus simply clamped on the outside of the cylindrical body of the fluid cylinder while orientating the insulated wire 10 tangentially with respect to the transversal section of the cylinder body. The connection means 13, 14, 15 and 17 is automatically oriented parallelly to the axis of the cylinder in order to place the removable detector element 16 parallelly to the axis of the cylinder and thus according to the direction of displacement of the piston or piston rod. After the pre-clamping of the collar 2, the active beam or the axis of vision 27 of the sensor element 16 is brought into position through axial sliding of the collar 2 on the cylinder body, the position of the collar 2 in rotation being generally not important and determined simply by the departure facilities of the insulated wire 10. After the definitive clamping of the collar 2 on the cylindrical body of the cylinder, the insulated block 8 remains in fixed position in order to allow the easy replacement of the sensor element 16 in the case of its failure, without having to perform a new adjustment of the position of the collar 2. The sensor element according to the invention applied to fluid cylinders, in particular small-size cylinders or micro cylinders, allows to avoid the use of special cylinder draw barson which is fixed the sensor in the known solution.

Figure 3:
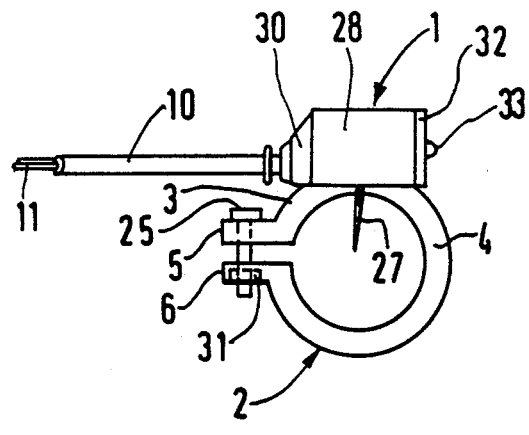
FIGS. 3 and 4 are side and rear views respectively of another embodiment of the sensor device according to the invention.
Figure 4:
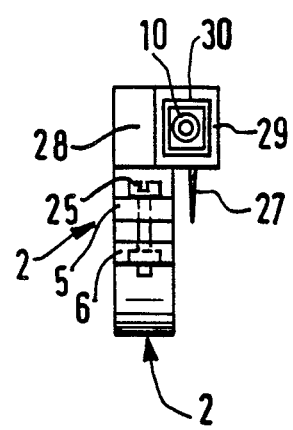

According to the embodiment shown at FIGS. 3 and 4 the items of sensor 1 which are identical with those on FIGS. 1 and 2 will be denoted by identical reference numbers as in FIGS. 1 and 2. The clamping collar 2 forms here a single block with the upper multifacial block but the latter is realized before mounting of the sensor under the form of a hollow element or shell 28 which surmounts the collar 2 and a part of which is placed laterally in a cantilevered manner relative to the collar 2. From this part 29 of the shell is coming a tip portion 30 for the exit of insulated wire 10 which can accordingly laterally protrude on the same side as the screw 25 without disturbing the access to the head of this screw to make sure that it is properly screwed into the nut 31 which is sunk in the extension 6.

When assembling the sensor according to FIGS. 3 and 4, the sensor element, itself, not shown on FIGS. 3 and 4 and which forms a similar block to the removable or interchangeable element 16 and is connected to an insulated wire 10, is advanced into the shell 28 so as to be set in place after introduction of wire 10 through the aperture of the tip portion 30. After setting in place of the sensor element in the shell 28, the latter is closed with a cover piece 32 which has at least one transparent window 33 for viewing the light indicator (not shown) of the sensor. According to the conditions of use of the sensor, the axis of vision 27 of the sensor element can be located in the median plane of the collar 2 or else, as represented at FIG. 4, in the median plane of the part 29 which is in lateral overhanging or cantilevered relationship. By means of this latter embodiment, it is possible to clamp the collar 2 on the accessible part of a cylinder body and to align the axis of vision 27 of the sensor element in front of a part which was relatively non-accessible during mounting of this cylinder body.

The sensor according to the invention has simple and esthetically pleasant form while ensuring considerable economy, both with respect to the installation costs, maintenance costs and spare parts management, since it is no longer necessary to dispose for the maintenance of a group of cylinders equipped with sensors, of an entire stock of special draw bars supporting the sensors.

It is well understood that the present invention is in no way limited to the embodiments described and represented herein-above and can be adapted to numerous alternatives available to those skilled in the art without departing from the scope and spirit of the invention.

I claim:

1. An electrical sensing device for sensing the position of a piston or piston rod relative to a cylinder, the sensing device comprising:
    (a) an annular clamping collar formed of a resilient electrically insulating material, having extensions which can be spaced apart to embrace the cylinder and tightened around the whole circumference of the cylinder by means of a tightening screw;
    (b) a block integral with said collar and having at least one face thereof parallel to the median plane of the collar;
    (c) a detector element carried by said block and supported in a cantilevered position with respect to the median plane of the collar so that the detector element has an axis of vision which is offset with respect to the median plane; and
    (d) a connection conductor protruding from the block for connecting the detector element to a monitoring system.

2. The sensing device according to claim I, including connection means on said at least one face of the block for removably connecting the detector element to the block.

3. The sensing device according to claim 2, wherein said connection means comprises cooperating male and female plugs, the plugs extending in a direction perpendicular to the median plane supporting and contacting the detector element.

4. The sensing element according to claim 3, wherein the male and female plugs are held in engagement by a threaded sleeve and a threaded ring.

5. A fluid cylinder assembly comprising:
    a fluid cylinder;
    a piston moveable within said fluid cylinder;
    a piston rod attached to said piston and extending out one end of the cylinder;
    an annular clamping collar formed of resilient electrically insulating material and securely clamped around the outer surface of the fluid cylinder;
    a block integral with said collar and having at least one face thereof parallel to the median plane of the collar;
    a detector element carried by said block for sensing the position of the piston relative to the cylinder wherein the detector element is supported in a cantilevered position with respect to the median plane of the collar so that the detector element has an axis of vision which is offset with respect to the median plane; and
    a connection conductor protruding from the block for connecting the detector element to a monitoring system.

* * * * *